United States Patent [19]

Szegedy

[11] 4,075,542
[45] Feb. 21, 1978

[54] INERTIA POWER SYSTEM

[76] Inventor: Robert J. Szegedy, 13 Mallory Hill Road, Georgetown, Conn. 06829

[21] Appl. No.: 600,062

[22] Filed: July 29, 1975

[51] Int. Cl.² .............................................. H02K 7/02
[52] U.S. Cl. .................................. 318/161; 180/65 A
[58] Field of Search .............. 318/161, 138, 254, 439; 280/217; 180/65 A; 310/108, 109

[56] References Cited

U.S. PATENT DOCUMENTS

| 2,941,477 | 6/1960 | Dalton | 310/109 X |
| 3,436,572 | 4/1969 | Storsand | 318/161 |
| 3,476,201 | 11/1969 | Swaine | 318/161 |
| 3,497,026 | 2/1970 | Calvert | 318/161 |
| 3,719,865 | 3/1973 | Ott et al. | 318/254 |
| 3,806,783 | 4/1974 | Lodochnikov et al. | 318/254 X |
| 3,853,194 | 12/1974 | Peterson | 180/65 A |
| 3,858,674 | 1/1975 | Tabor | 180/65 R |
| 3,923,115 | 12/1975 | Helling | 180/65 A |

Primary Examiner—Robert K. Schaefer
Assistant Examiner—John J. Feldhaus

[57] ABSTRACT

An inertia power system in which the rotational energy stored in a rotating inertia wheel is translated into useful work. The system includes an inertia wheel which is electrically driven. A magnetic clutch is provided for engaging and disengaging the rotating inertia wheel into and out of driving relationships with a transmission assembly through which the rotation of energy of the inertia wheel is translated into useful work, e.g.; to drive a vehicle.

6 Claims, 8 Drawing Figures

INERTIA POWER SYSTEM

BRIEF SUMMARY OF THE INVENTION

An inertia power system which comprises an inertia wheel rotatably journalled in a housing under a negative pressure environment to minimize air resistance on the inertia wheel. A drive means which includes a first magnet which is rotatably connected to the inertia wheel to rotate therewith. Circumferentially spaced about the first magnet are a plurality of electromagnets to define a stator for the first magnet. A second magnet is disposed relative to the first magnet so as to be subjected to the magnetic field of the first mentioned magnet. The arrangement is such that a source of electrical energy is wired to the second magnet to sequentially energize the electromagnets as the second magnet rotates in unison with the first mentioned magnet.

Operatively connected to the output side of the inertial wheel is a clutch for engaging and disengaging the inertia wheel to a transmission assembly whereby the stored rotational energy of the inertia wheel is translated into useful work.

The various features and other advantages will become more readily apparant when considered in view of the drawings in which.

DETAIL DESCRIPTION

Figure 1:
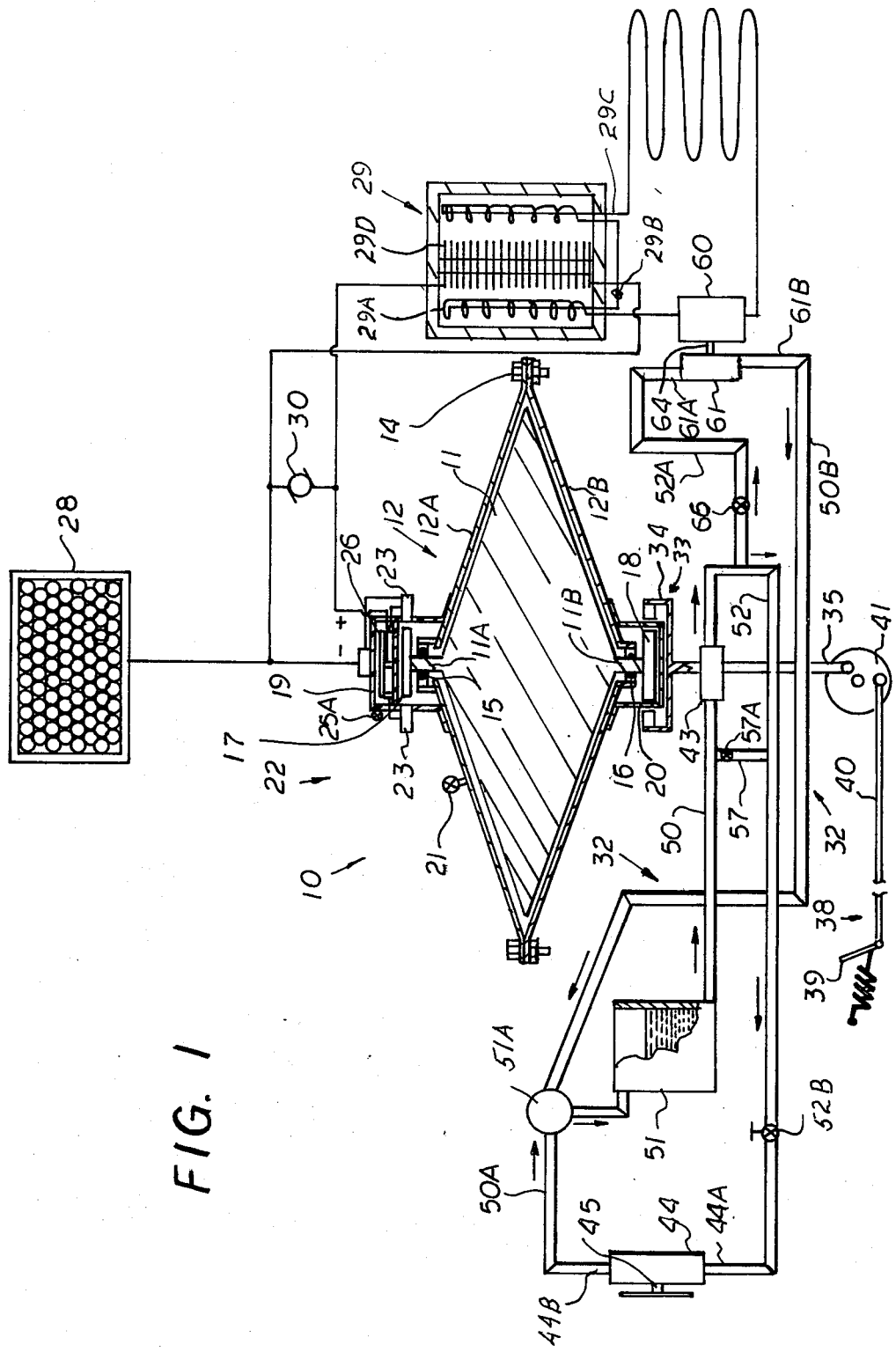
FIG. 1 illustrates a diagramatic assembly of an inertia power system embodying the present invention.

Referring to FIG. 1 of the drawings, there is illustrated an inertia power system 10 embodying the invention. The system includes an inertia wheel 11 which is rotatably journaled in a wheel housing 12. As shown, the inertia wheel 11 is formed of a solid material e.g.; metal or reinforced composite material which has substantial bulk at the center and which tapers outwardly toward the outer periphery thereof. The wheel 11 is so configured so as to minimize the stresses of centrifugal forces which is greatest at the outer periphery of the wheel. It will be understood that the wheel 11 is intended to have substantial mass, and may weigh 500 pounds.

The housing 12 is formed of a pair of similar complementary shells 12A, 12B which are secured about the outer margin thereof by circumferentially spaced fasteners, e.g.; bolts 14. The opposite disposed trunnions 11A and 11B of the inertia wheel 11 are rotatably journaled in bearings 15 and 16 respectively.

Fixedly secured to each of the input trunnion 11A and the output trunnion 11B of the inertia wheel 11 is a magnet 17 and 18 which are arranged to rotate with the inertia wheel 11. Encasing the respective magnets 17 and 18 is an enclosure 19 and 20 respectively. In the illustrated embodiment, the respective enclosures 19 and 20 are formed of a non magnetic material, e.g.; plastic or the like. As best seen in FIG. 1, the arrangement is such that the inertia wheel is sealed air tight within the housing shells 12A, 12B with the ends sealed by enclosures 19 and 20. To minimize air resistance on the inertia wheel 11, the housing 12 is provided with a valve 21 through which the interior of the housing 12 can be evacuated by any air therein. In this manner, the inertia wheel 11 is rendered readily rotatably journaled in a sealed housing 12 which in maintained under a negative pressure environment.

Figure 2:
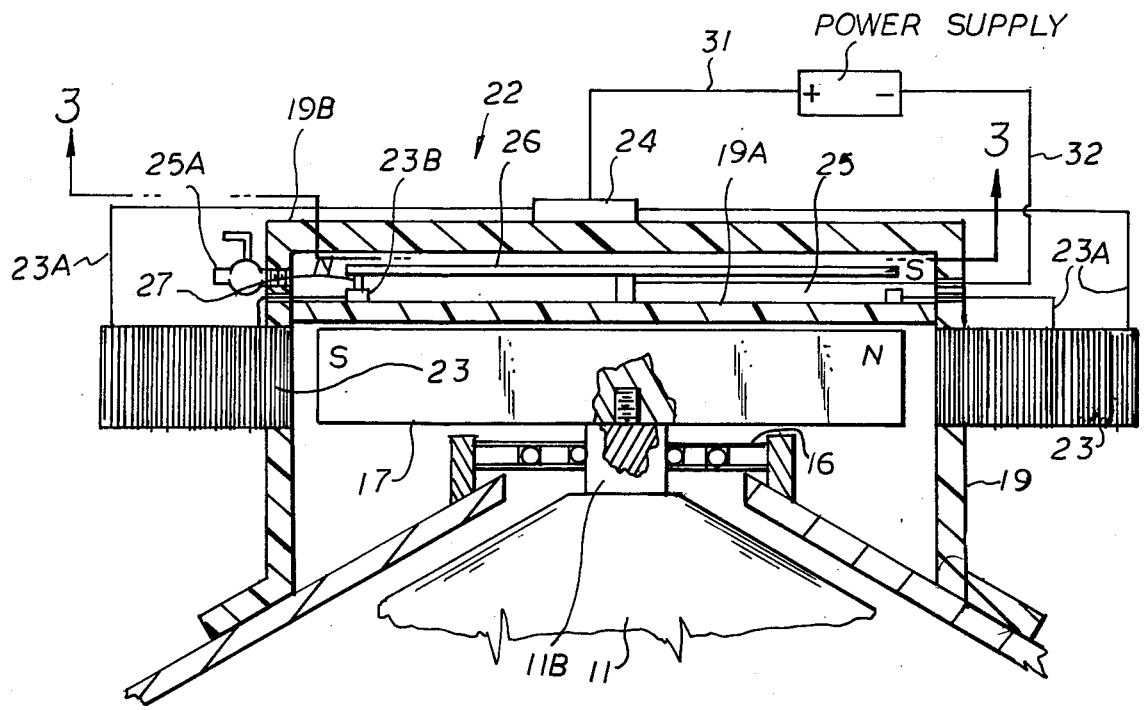
FIG. 2 is an enlarged detailed sectional view of the electric drive for the inertia wheel.
Figure 3:
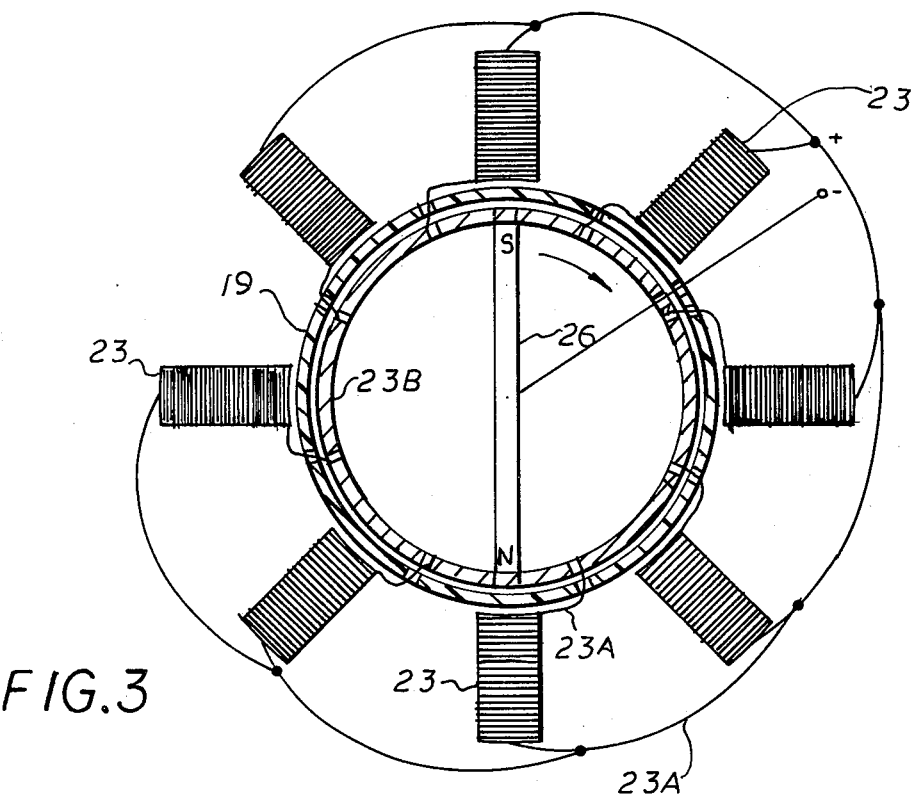
FIG. 3 is a plan view taken along line 3—3 on FIG. 2.

A drive means 22 is operatively connected to the input side of the inertia wheel 11. In the illustrated embodiment the drive means 22 includes a plurality of electromagnets 23 which are circumferentially spaced about the exterior side of the end closure 19 opposite the poles of magnet 17. As best seen in FIGS. 2 and 3 the windings 23A of the respective electromagnets are connected between associated commutator stator 23B which are serially spaced on an immediate support 19A within enclosure 19 and a terminal contact 24 located on the top surface 19B of the enclosure. As best seen in FIG. 2, the intermediate support 19A and top 19B of the enclosures are each formed of a non magnetic material and are disposed in spaced apart relationships, the intermediate support 19A enclosing the magnet 17 within the housing.

Rotatably disposed within the space 25 between support 19A and the top 19B of the enclosure is a magnet 26. As shown, the magnet 26 is such as to have a field which is substantially less than the field of magnet 17. Thus, the field of magnet 26 does not greatly effect the field of magnet 17. However, the field of magnet 17 which is greater than that of magnet 26, will effect magnet 26. As shown, the poles of magnet 17 are oppositely disposed to that of magnet 26. The arrangement is such that when magnet 17 is rotated, its magnetic field will cause magnet 26 to rotate therewith.

Connected to one pole of magnet 26 is a brush 27 which is arranged to electrically contact the commutator segments 23B.

Operatively connected in circuit with the electromagnets is a source of electrical energy. As best seen in FIG. 1, the electromagnets can be energized either by solar cells 28, a heat battery 29, and/or by a conventional power supply, e.g.; batteries or generator 30, by conductors 31 and 32. It will be noted that when the respective electromagnets are serially energized in sequence, the field developed will cause magnet 17 to rotate, which rotation is imparted to the inertial wheel 11 and to magnet 26. The latter acts as a distributor for sequencing the actuation of the respective electromagnets as the brush 27 makes successive contact with the commutator section, 23B.

Referring to FIG. 2, the space 25 is provided with an air valve 25A to provide evacuation of space 25 to reduce any air resistance on magnet 26. The drive when actuated, is arranged to impart relatively high rotation speeds to the inertia wheel 11, e.g.; 100,000 R.P.M. In view of the mass and R.P.M. of the wheel, a considerable energy source is made available.

Figure 4:
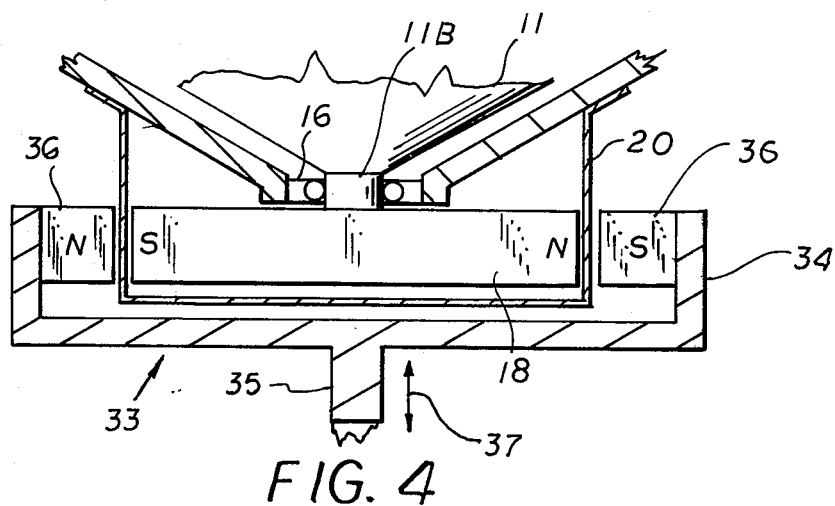
FIG. 4 is a detailed sectional view of the magnetic clutch utilized in the illustrated form of the invention.

To translate the stored energy of the rotating inertia wheel there is provided a transmission means 32 and a clutch means 33 for engaging and disengaging the inertia wheel to the transmission means 32. Referring to FIGS. 1 and 4, the magnet 18 is connected to the output trunnion 11B of the inertia wheel forms the driving clutch member. The complementary or driving clutch member includes a cylinder 34 connected to a drive shaft 35. Connected to the internal surface of the cylinder 34 are magnets 36. The arrangement is such that the complementary clutch member 34 and connected magnets 36 is mounted for axial movement toward and away from the driving magnet 18 as indicated by arrow 37. Thus, it will be noted that as the complementary clutch member 34 is moved downwardly, as shown in FIG. 4, the magnetic attraction between magnets 18 and 36 is decreased.

To control the displacement between the driving magnet 18 and the complementary clutch member 34, an actuator 38 is provided. As shown in FIG. 1, the actuator 38 comprises a foot pedal 39, which through a linkage 40 and sector 41, is connected to the drive shaft 35 to effect the linear displacement of the clutch member 34 accordingly.

The transmission means 32 in the illustrated embodiment is fluid actuated. It includes a pump 43 for pressurizing the fluid circulating through the system to effect the drive of a turbine 44. The rotor 44A of the turbine 44 in turn is connected to the main drive shaft 45 for producing useful work, e.g.; the drive shaft of a vehicle or other work producing machines.

Figure 5:
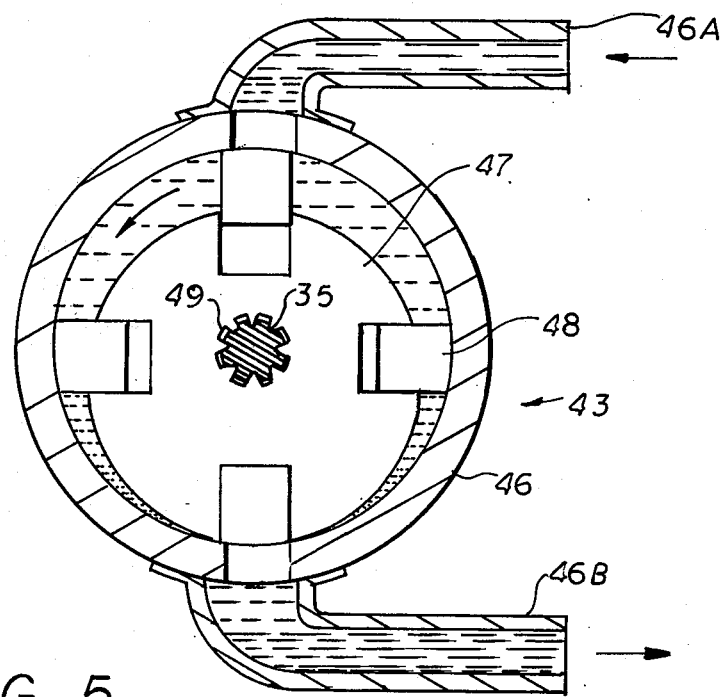
FIG. 5 is a sectional view of the pump section of of the fluid transmission.

Referring to FIG. 5, the pump 43 comprises a centrifugal type pump which includes a pump housing 46 in which a rotor 47 is eccentrically offset. Moveably connected to the pump rotor 47 are a series of radially adjusted vanes 48. The rotor 46 is provided with a spline opening 49 adapted to receive the drive shaft 35 of the clutch member 34. The shaft 35 is splined to effect the drive of the pump rotor 47 while at the same time provides for limited linear movement thereof necessary to effect engagement and disengagement of the clutch 33.

The inlet end 46A of the pump 43 is connected to a return conduit 50 which connects with a reservoir 51 containing a supply of hydraulic fluid. The outlet 46B of the pump connects with a pressurized supply conduit 52 which directs pressurized fluid to the inlet side 44A of the turbine 44. A control valve 52B is diposed in conduit 52 to regulate the flow of hydraulic fluid through the fluid transmission.

Figure 6:
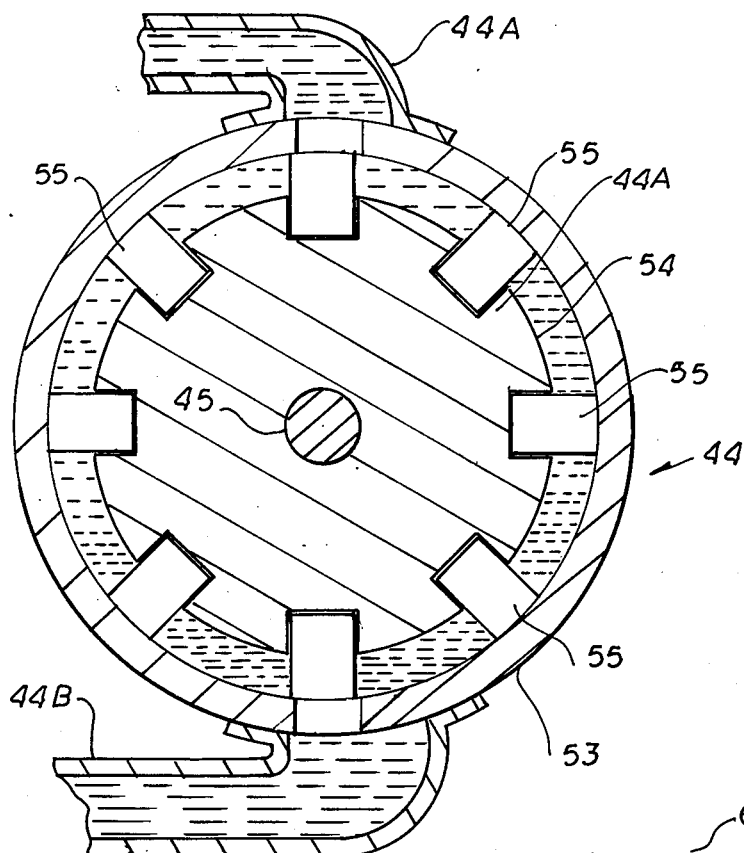
FIG. 6 is a detailed sectional view of the fluid drive turbine.

Referring to FIG. 6, the turbine 44 includes a turbine housing 53 having a rotor 54. A series of turbine blades 55 are circumferentially spaced about the rotor to effect the drive thereof as the pressurized fluid impinges thereon. The outlet 44B of the turbine connects with a return line 50A which empties into reservoir 51.

To avoid any excess build up of fluid pressure in the transmission, a by-pass 57 having a pressure relief valve 57A is interconnected between the supply conduit 52 and the return conduit 50. In the event of any backpressure build up on the turbine 44, the relief valve 57A in the by-pass 57 will operate to direct any excess pressure to the low pressure side of the system.

In the illustrated embodiment it will be noted that when the clutch 33 is adjusted so as to be operative, the rotational energy of the inertia wheel 11 is imparted to the pump 43 which in turn pressurizes the fluid to drive the turbine 44 and associated drive shaft 45.

When a heat battery 29 is utilized as a source of electric energy, its compressor 60 is driven by a turbine 61 actuated by the pressurized fluid of the transmission means 32.

Figure 7:
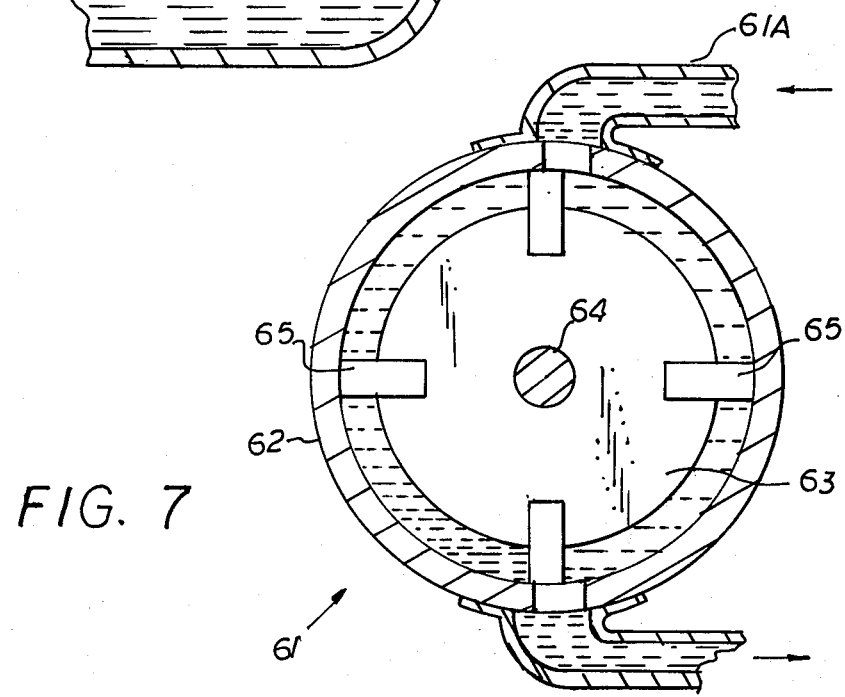
FIG. 7 is a sectional view of the hydraulic drive for the heat battery compressor.
Figure 8:
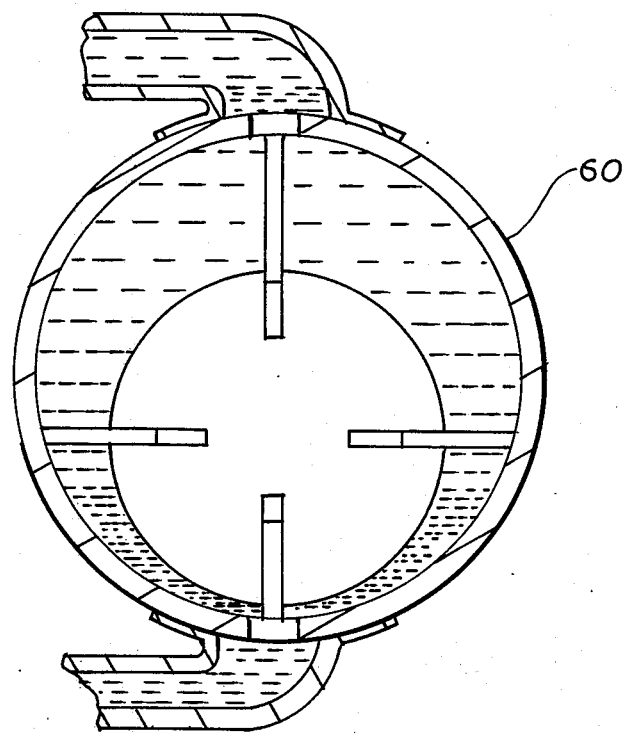
FIG. 8 is a sectional view of the compressor pump.

Referring to FIG. 7, the turbine 61 is somewhat similar to turbine 44. It comprises a housing 62 in which a rotor 63 is journalled on shaft 64. Radial extending vanes 65 effect the drive of rotor 63 as the pressurized fluid impinges on vanes 65. As seen in FIG. 1, the inlet 61A to turbine 61 connects with a branch supply conduit 52A. The outlet 61B connects with a return line 50B which empties into a heater 51A, and thus to reservoir 51. A valve 66 may be placed in line 52A to control the flow of fluid to turbine 61.

Disposed in the coil 29A of the heat battery is a valve 29B which functions to increase the pressure on one side of the heat battery. Thus the temperature change resulting from the fluid being compressed by compressor 60 in flowing through the compressive stage 29A to the evaporting stage 29C and acting on plates 29D produces an electrical current which may be utilized to rotate the inertia wheel.

The rotor of the compressor 60 in turn is driven by the drive shaft 64 of turbine 61. The arrangement is such that when the heat battery 29 is actuated, the compressor 60, which is a centrifugal pump, will function to compress the circulating fluid of the heat battery whereby the relative temperature differential between the heating of the battery fluid on compression and the cooling thereof on evaporation is utilized to generate an electrical current to power the drive means 22.

In operation, it will be noted that when the electromagnets 23 are energized, they function as a stator causing the driving magnet 17 to effect the drive of the inertia wheel 11 and the distributor magnet 26. In this manner, the inertia wheel 11 is rotated to substantial R.P.M.'s. The inertia energy thus stored in the rapidly rotating wheel 11 is extracted as desired by actuating of the magnet clutch 33 to effect the operation of the transmission means accordingly.

When the inertia wheel 11 has run deep, it can be readily recharged simply by building up its R.P.M.'s. e.g.; by an overnight charge.

It will be understood that the inertia system described can be utilized to power various types of vehicles, machines, shops, etc.

While the present invention has been described with respect to particular embodiment thereof, it will be appreciated and understood that variations and modifications may be made without departing from the spirit or scope of the invention.

What is claimed is:

1. An inertia power system comprising:
   an inertia means including an inertia wheel for storing rotational energy and having an input and output end,
   a drive means for effecting the rotation of said inertia wheel, operatively associated with the input end,
   said drive means comprising an input magnet having a north and south pole journalled to said inertia wheel to rotate therewith,
   a plurality of serially energized electromagnets circumferentially spaced about said input magnet so as to be opposite the poles of said magnet,
   a second magnet rotatably mounted so as to be under the influence of said first magnet,
   said second magnet having a field which is substantially less than the field of said input magnet,
   spaced commutator stator stations operatively associated with said second magnet,
   a terminal contact,
   said electromagnets having windings connected between the associated commutator stator sections and said terminal contact, and said second magnet having its poles oppositely disposed relative to the poles of said input magnet, and a brush carried on one of the poles of said second magnet so as to electrically contact said commutator stator sections, and a source of electrical energy for serially energizing said electromagnets whereby the developed field effects the rotation of said input magnet which imparts rotation to said inertia wheel and said second magnet, and including a clutch means having;

an output magnet connected to the output end of said inertia wheel to rotate therewith, a complementary clutch member moveably mounted relative to said output magnet, said complementary clutch member including a plurality of magnets adapted to lock and unlock onto said output magnet as said complementary member is moved relative thereto, and means for actuating said complementary clutch member.

2. The invention as defined in claim 1 and including a transmission means connected to said clutch means, said transmission means comprising;

a fluid system including a pump means operatively connected to said clutch means whereby said pump means is driven by said inertia wheel to pressurize the fluid of said fluid system, a fluid drive means, supply conduit interconnecting said pump means to said fluid drive means whereby said pressurized fluid is directed to said drive means, and a drive shaft operatively connected to said fluid drive means to be driven thereby when said fluid drive means is activated.

3. The invention as defined in claim 2 wherein said fluid system includes a tank for containing a supply of fluid, a return conduit, said tank being disposed in said return conduit between the outlet of said drive means and said pump means, a by pass interconnected between said supply conduit and return conduit;

and a pressure relief valve disposed in said by pass to relieve the system in any build up of pressure therein.

4. The invention as defined in claim 1 wherein said source of electrical energy comprises a solar cell.

5. The invention as defined in claim 1 wherein said source comprises a heat battery unit.

6. An inertia power system comprising:

an inertia means including an inertia wheel for storing rotational energy, drive means for effecting the rotation of said inertia wheel, a transmission means, and a clutch means disposed between said transmission means and said inertia wheel for engaging and disengaging said transmission means into and out of driving relationship with said transmission means, said drive means comprising an electromagnetic drive, said electromagnetic drive including an input magnet journalled to said inertia wheel to rotate therewith, a series of electromagnets circumferentially spaced to define a stator about said input magnet, means for serially engaging said electromagnets for attracting said input magnet to effect rotation of said input magnet and connected inertia wheel, said last mentioned means including a commutator segment electrically connected to each of said electromagnets, a distributing bar magnet rotatably disposed relative to said commutator segments, a contact connected to one end of said bar magnet for making contact with said commutator segments on which said bar magnet revolves, and a source of electrical energy connected to said distributing bar magnet, wherein said source comprises a heat battery unit, wherein said heat battery comprises a compressor coil and an evaporating coil, a compressable gas circulated through said coils, a compressor for compressing said gas, and a supply line having a branch conduit connected to said compressor whereby said compressor is actuated by the high pressure fluid flowing to said compressor through said branch conduit.

* * * * *